Figure 1:
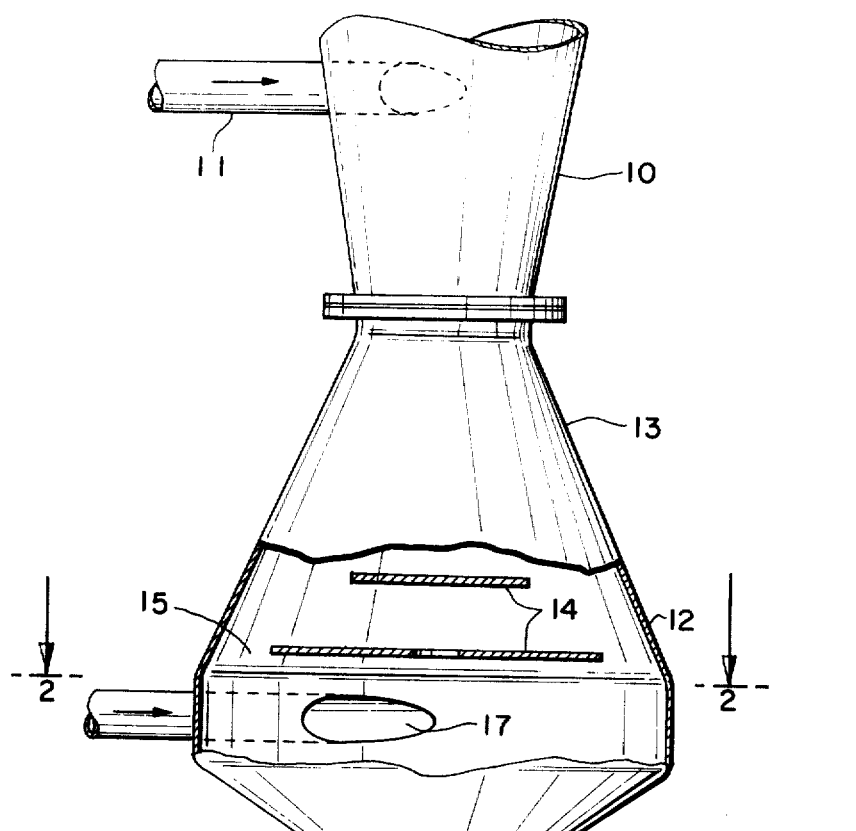
Figure 2:
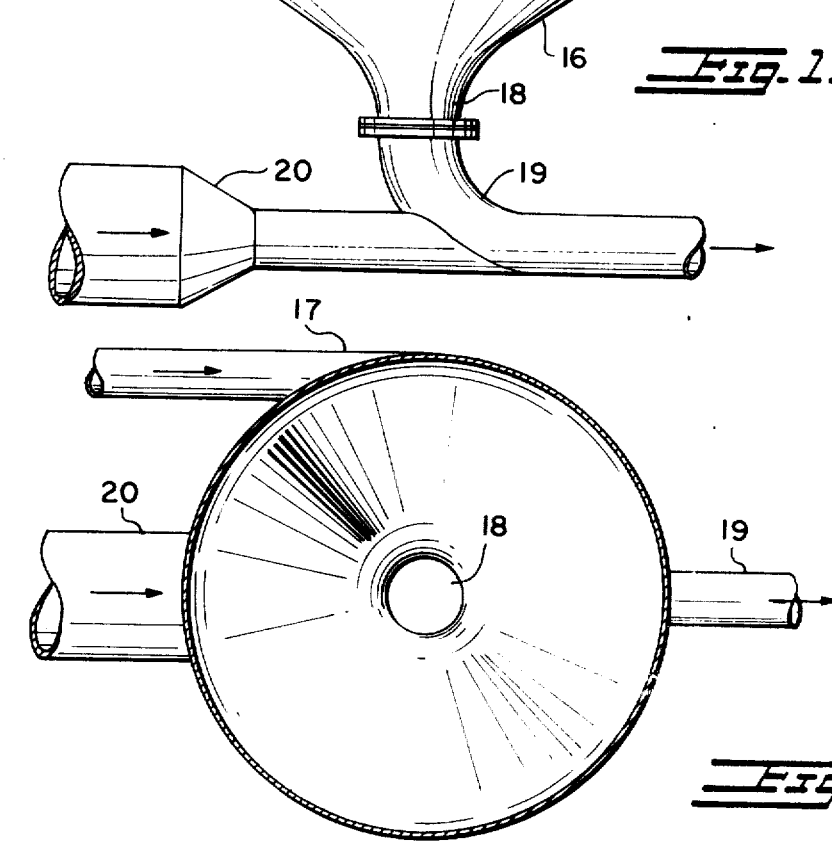

United States Patent [19]
Winkler et al.

[11] 3,874,738
[45] Apr. 1, 1975

[54] PROCESS AND APPARATUS FOR THE RAPID TRANSFER OF A PRODUCT FROM A GAS STREAM INTO A CARRIER GAS STREAM

[75] Inventors: Heinz Winkler, Burghausen; Siegfried Strebel, Raitenhaslach, both of Germany; Ferdinand Reich, Braunau, Austria

[73] Assignee: Wacker-Chemie GmbH, Munich, Germany

[22] Filed: Feb. 5, 1974

[21] Appl. No.: 439,817

[30] Foreign Application Priority Data
Feb. 5, 1973 Germany.......................... 2305497

[52] U.S. Cl........................ 302/21, 302/59, 302/66
[51] Int. Cl...................... B65g 53/28, B65g 53/40
[58] Field of Search............ 302/21, 23, 36, 59, 62, 302/64, 66

[56] References Cited
UNITED STATES PATENTS
| | | | |
|---|---|---|---|
| 2,010,231 | 8/1935 | Heist | 302/59 X |
| 2,252,581 | 8/1941 | Saint-Jacques | 302/59 X |
| 2,869,677 | 1/1959 | Yellott et al. | 302/59 X |

FOREIGN PATENTS OR APPLICATIONS
| | | | |
|---|---|---|---|
| 1,185,535 | 1/1965 | Germany | 302/59 |

*Primary Examiner*—Richard A. Schacher
*Assistant Examiner*—W. Scott Carson
*Attorney, Agent, or Firm*—Allison C. Collard

[57] ABSTRACT

A process for rapidly transferring a product from a gas stream into a carrier gas stream while avoiding an intermixture of the two gas streams which comprises separately introducing the product-containing gas stream and the carrier gas stream at different levels into a separating apparatus, maintaining separation of the two gas streams by insert means forming a slot with the wall of the lower part of the apparatus, and deflecting the product particles entering with said first gas stream to pass through the slot and thereby to meet the carrier gas stream at the lower level, by which stream they are taken along, and finally withdrawing the carrier gas stream with the particles therein at the bottom of the apparatus. An exemplary embodiment of the apparatus by which the process may be carried out is likewise shown.

5 Claims, 2 Drawing Figures

PROCESS AND APPARATUS FOR THE RAPID TRANSFER OF A PRODUCT FROM A GAS STREAM INTO A CARRIER GAS STREAM

The present invention relates to a process and apparatus for the rapid transfer of a product from a gas stream into a carrier gas stream.

It is known in the art to precipitate products from gas streams by means of separators, mostly by cyclones. The effect is based on the principle that the gas stream is forced to rotate at rising speed by means of a conical restriction in the cyclone. The particles of the product are thrust outwardly by centrifugal force and braked at the wall of the cyclone by friction, whereas the almost weightless gas practically retains its speed. Thus, due to gravity, the product particles drop out of the separator at one end, while the gas is withdrawn from the center of the cyclone in upward direction. This theoretical action requires such an accurate adjustment of the pressure conditions in the cyclone, that it is not feasable in practical operation. In the case of excess pressure, gas escapes with the product from the connecting drier, or, in the case of reduced pressure, gas is sucked into the separator, which usually leads to a loss of the precipitate. In order to avoid these drawbacks, it has been conventional to use, for example, bucket wheel locks or pendulum flap valves as sealing means.

However, it is frequently necessary, particularly when working with temperature-sensitive or adhesive products, to provide free discharge and rapid passage from the cyclone to a second, sometimes conditioned, air stream without an intermixture of the two gas streams taking place. This is necessary for operational reasons, and for obtaining better quality. For the purpose mentioned, DAS 11 85 535 arranges a vortex chamber in series with the cyclone, the chamber being equipped with tangential admission and discharge pipes for the carrier gas wherein the pipes are arranged at different heights. As a consequence, the product-laden gas stream is turbulently drawn down into the small cylindrical vortex chamber where it is surrounded by the coaxially whirling carrier gas stream. An intermixture of the two gas streams is avoided only theoretically, whereas in reality, intermixtures are clearly noticeable.

It is an object of the present invention to provide a process and an apparatus for rapidly passing a product from a gas stream into a conditioned carrier gas stream, the process and apparatus being free of the shortcomings of the known methods and devices.

More particularly, it is an object of the present invention to provide a process and device of the above-mentioned type, wherein the intermixture of the two gas streams is strictly avoided.

Other objects and advantages of the present invention will become apparent from the following detailed description in connection with the accompanying drawing.

In carrying out the invention with the above objects in mind, the product-laden gas stream is introduced into a known separator, preferably a cyclone, and the product is then taken up in a carrier gas stream in a following device. According to the invention, the gas stream is separated from the carrier gas stream by the arrangement of a centrally disposed insert, which forms an annular slot or clearance with the wall of the device, through which the product is passed into the carrier gas stream. The latter is fed through an admission pipe tangentially with respect to the lower part of the second device, and centrally withdrawn therefrom.

The apparatus will be described more fully with reference to the accompanying drawing in which;

FIG. 1 is a schematic illustration of an embodiment of the apparatus according to the invention; and FIG. 2 shows the apparatus in a section taken along line A – B of FIG. 1.

Referring now to FIG. 1, there is shown a cyclone 10, connected to a second product separating device 12. A feed-in pipe 11 serves for admitting the product-laden gas. The upper conical part 13 of device 12 is provided with inserts 14, which together with the conical wall, form an annular slot 15. The portion 13 of device 12 merges into a bottom portion 16 tapering downwardly toward a central opening 18. A pipe for introducing the carrier gas having an inlet opening 17 is arranged for tangentially conducting the gas along the wall of lower portion 16, where it receives the product passing down through annular slot 15. In addition to withdrawal opening 18, a duct 19 is provided for carrying off the product. There is also shown a pipe 20 for the admission of additional carrier gas.

FIG. 2 shows especially the arrangement of pipe 17, while opening 18, and pipes 19 and 20 are the elements described with reference to FIG. 1.

While other separators of the known art may be used, the preferred separator is a cyclone. The size and shape (acute angle, obtuse angle) of the cyclone are adapted to the requirements of the product and gas to be separated.

In the device shown in the drawing, the inclination of the conical portion 13 may be changed, as necessary. It is sometimes even possible to use a cyclindrically shaped upper portion. With sloping walls, the product is braked, but it still moves down by inertia along the conical wall. The whirling gas stream, however, enters portion 12 centrally, and cannot go any further than to inserts 14. Due to the conical configuration, the product and the gas stream are at a considerable distance from one another and the whirling gas stream, withdrawn in an upward direction, cannot entrain solid particles. There is consequently a maximal separation of the product from the gas taking place.

The product, which passes through annular slot 15 into the bottom portion 16 of the apparatus, is immediately taken up by the carrier gas stream, and remains in movement all the time. The annular slot 15 is made of appropriate size in accordance with the amount of product which passes through to make sure that clogging will be avoided and that every part of the product reaches the bottom.

Inserts 14 may be made in a variety of shapes. The simplest form is a circular plate. However, it is advantageous to have the inserts comprise several horizontal elements, with the top element having the smallest diameter, the bottom element having the largest diameter, and with all elements, except the top one, having a central discharge opening. The top element may be provided with a cone-shaped head piece. This has the advantage that particles which do not drop directly into the annular slot, but impinge upon the insert, will slide off and thus likewise reach the slot. The several other horizontal elements having a central outlet opening are mostly slanting toward the opening so that the particles will slide downward. These additional means will insure that no particles will become lodged in the device, even if they do not follow the normal flow pattern. It is thus possible to positively prevent damage to the particles by preventing them from staying too long in one place.

As mentioned before, the product is taken along by the carrier gas stream in bottom portion 16, the region where the stream enters the wall tangentially by means of inlet 17. The stream moves along the wall until it reaches the central discharge opening 18 where it leaves device 12 charged with product particles. In the embodiment illustrated, only part of the carrier stream is blown into the bottom part 16 of device 12. A second part is fed into pipe 20 through a nozzle with an ejector effect. In that manner, it is possible to adjust the pressure in the apparatus in the best manner, since by regulation of the quantities in the partial gas streams, a reduced pressure can be generated which is well suited for constant separation.

The carrier gas most frequently used is air. However, other gases are also suitable, such as nitrogen or noble gases. The carrier gas stream is often conditioned, that is, it may be subjected to certain measures before receiving the product, so that the temperature of the gas remains constant, its humidity is low, and its purity is high.

The gas stream from which the product is to be precipitated is likewise mostly air. But in this case, other gases, such as nitrogen and noble gases may be used. This gas stream is often hot, and contains undesirable admixtures, such as hydrogen chloride, humidity, or solvents, from which the product should be freed. The process and apparatus according to the invention lead to a rapid transfer of the product while avoiding an intermixture of the two gas streams.

The invention is particularly important for products which are temperature-sensitive and/or tend to become sticky when softened. In such cases, it is necessary to transfer the products rapidly from a hot gas stream into a cool carrier gas stream. One example is aqueous dispersions of synthetics which upon spray-drying, form powders having the tendency to adhere together when warm. As long as the water is evaporating, the synthetic particle does not become very warm, since the cooling of the evaporation of water prevents any substantialy heat-up. But as soon as dryness sets in, a speedy transfer from the hot gas stream into the cold carrier stream become necessary. The process of the invention makes this possible, without the wet gas stream becoming mixed with the carrier gas stream, which may have been dried and cooled. A decisive factor for the utility of the process and apparatus according to the invention is, in addition to the rapid transfer of the product from the gas stream to the carrier gas, without intermixture of the gases, that the product remains constantly in motion and thus the particles have no opportunity of sticking together.

Examples of synthetics to be processed are: Homo-, co-, and graft polymers of acrylic acid esters; styrene esters, acrylic or methacrylic esters; styrene, butadiene and acrylic esters; vinyl esters, especially vinyl acetate; vinyl acetate and straight-chain vinyl esters with 3–18 C-atoms; vinyl acetate and branched vinyl esters with 4–18 C-atoms; vinyl ester and vinyl chloride and/or olefins, vinyl chloride, acrylic ester and vinyl acetate; vinylidene chloride, acrylic esters and vinyl acetate; vinylidene chloride and acrylic ester. The process of the invention is of particular significance for polymers having a low softening point, e.g. 0° to 40°C. Such polymers are, for example, copolymers of vinyl acetate and/or vinyl chloride and ethylene, preferably up to 30% by weight of ethylene; vinyl acetate and/or vinyl chloride and vinyl laurate with over 20% vinyl laurate; vinyl acetate and acrylic esters with alcohols having a chain length of more than 4 C-atoms; vinyl acetate and vinylversatic esters (versatic acid trade name of Shell for branched carboxylic acids of different chain lengths) and vinyl propionate copolymers.

However, the process is also suitable for the separation of other mixtures of gaseous products. Thus, all mixtures obtained by spray drying can be separated and the products rapidly transferred into a carrier gas stream. Other examples are preparation of dried milk or passing of solutions of synthetics through nozzles; in the latter, condensation of solvent upon cooling of the product is avoided due to the transfer from one to the other gas stream.

The invention will now be explained in an example but it should be understood that this is given by way of illustration and not of limitation.

EXAMPLE

In an apparatus as illustration in FIG. 1, a hot, moist mixture of air and ethylene-vinyl acetate copolymer powder is introduced as described above. Dry air is fed through inlet 17 as well as through pipe 20. The dry air takes over the precipitated product and conveys it via pipe 19, aided by the carrier gas stream fed-in through pipe 20, for deposit in a storage silo (not shown). The copolymer powder obtained is of excellent quality, that is, it has no damaged particles, and does not exhibit any clog formation.

It will be obvious to those skilled in the art that other changes and variations can be made in carrying out the present invention without departing from the spirit and scope thereof as defined in the appended claims.

What is claimed is:

1. A process for rapidly transferring a product from a gas stream into a carrier gas stream while avoiding an intermixture of the two gas streams which comprises separately introducing the product-containing gas stream and the carrier gas stream at different levels into a separating apparatus, maintaining separation of the two gas streams by insert means forming an annular slot with the wall of the lower part of the apparatus, and deflecting the product particles entering with said first gas stream to pass through the slot and thereby to meet the carrier gas stream at the lower level, by which stream they are taken along, and finally withdrawing the carrier gas stream with the particles therein at the bottom of the apparatus.

2. The process according to claim 1, wherein a part of the carrier gas stream is blown in separately near the bottom of the apparatus for better adjustment of the pressure conditions in the apparatus.

3. An apparatus for rapidly transferring a product from a gas stream into a carrier gas stream while avoiding an intermixture of the two gas streams, comprising:

a top separator of the cyclone-type and a bottom separator connected therewith said bottom separator having a wall;

pipe means in the top separator for introducing said product-laden gas stream;

separate pipe means for introducing carrier gas into said bottom separator, said separate pipe means entering the wall tangentially, said bottom separator having the shape of a double cone with downwardly increasing diameter in the upper portion, into which said separate pipe means for the carrier gas opens, and decreasing diameter toward the bottom;

insert means centrally arranged in the upper cone of said bottom separator, said insert means forming an annular slot with the wall of said upper cone and being capable of receiving particles entering said bottom separator and being deflected by said insert means;

centrally arranged withdrawal pipe means at the bottom of said lower cone for carrying off the carrier gas stream with the product particles therein, and further pipe means in the top separator for withdrawing the gas stream freed of product particles.

4. The apparatus as claimed in claim 3 wherein said insert means comprises a plurality of horizontal elements of increasing diameters from top to bottom, all elements with the exception of the uppermost having central withdrawal openings.

5. The apparatus according to claim 4, including additional pipe means for feeding carrier gas into said withdrawal pipe at the bottom of the lower cone for adjusting the pressure conditions in the apparatus.

* * * * *